Feb. 26, 1924.
O. MESSTER
1,485,195
OPTICAL RECTIFIER FOR CINEMATOGRAPHIC APPARATUS
Filed April 28, 1921
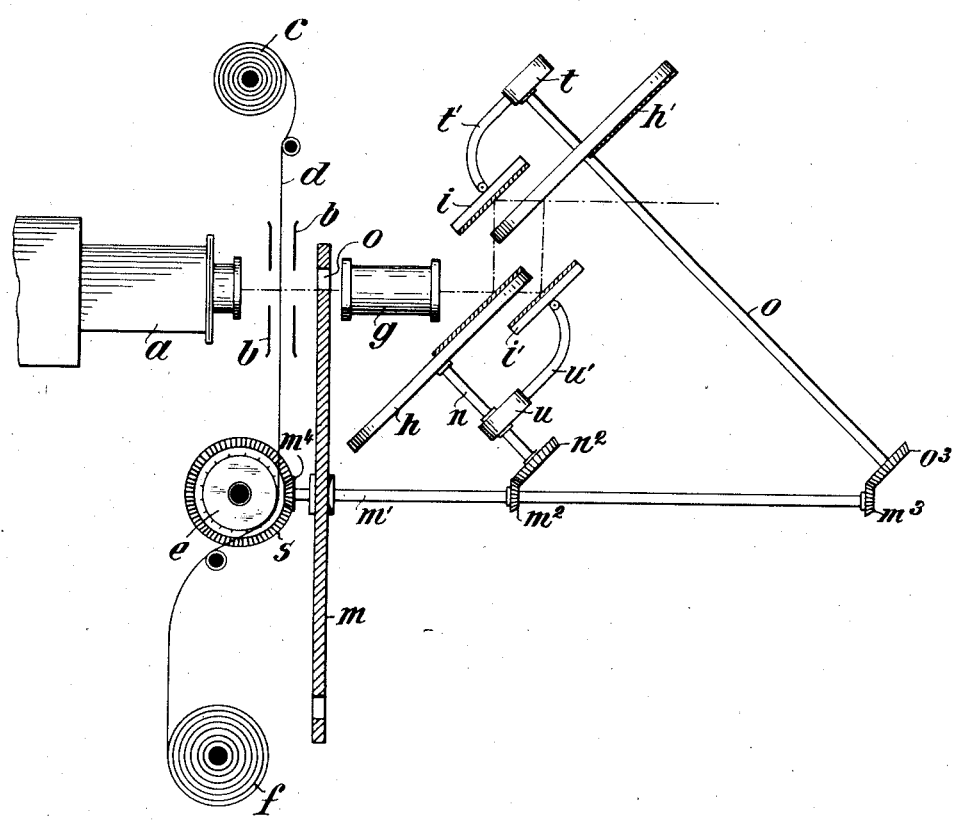

Patented Feb. 26, 1924.

1,485,195

UNITED STATES PATENT OFFICE.

OSKAR MESSTER, OF BERLIN, GERMANY.

OPTICAL RECTIFIER FOR CINEMATOGRAPHIC APPARATUS.

Application filed April 28, 1921. Serial No. 465,274.

*To all whom it may concern:*

Be it known that I, OSKAR MESSTER, of 110–111 Leipzigerstrasse, Berlin, Germany, a citizen of the German Republic, have invented certain new and useful Improvements Relating to Optical Rectifiers for Cinematographic Apparatus, of which the following is a specification.

This invention relates to cinematographic apparatus for the production of picture-series operating with a continuously running film-band and alternately acting optical compensating means, and is an improvement in the invention described and claimed in the specification of my Patent Number 1,432,405.

In accordance with the present invention means are provided whereby the method of compensation, described in the specification of the pending application aforesaid, for obviating a disturbing parallax when projecting the pictures, is also adapted for use in taking the pictures.

To the attainment of this end the optical system for conducting the pictures alternately to the one and to the other compensating means, comprises mirror-segments arranged parallel to one another in front of, and inclined to, the objective and adapted to be moved alternately into the ray-path through the latter, and deflecting mirrors arranged for oscillation before and behind said mirror-segments.

The invention is illustrated, by way of example, on the annexed drawing, whereon, as in the parent application aforesaid, $a$ is the lamp-box, $b$ the guide channel for the film $d$, $m$ the rotary shutter, and $g$ the objective.

Under the present invention two rotatable mirror-segments $h, h^1$ are arranged parallel to each other in front of, and inclined to the objective, and two oscillatory mirrors $i, i^1$ are provided in conjunction therewith of which $i^1$ is arranged before the mirror-segment $h$ and $i$ behind the mirror segment $h^1$.

In operation, the mirror segments $h, h^1$ are rotated at uniform speed and so that first one and then the other is moved into the ray-path through the objective $g$, then when using the apparatus as a projector, first a picture is projected from the objective $g$ to the rotating mirror $h$ thence to the oscillating mirror $i$, (the mirror-segment $h^1$ being clear of the latter at this moment) and finally to the screen; the next picture is projected from the objective $g$ to the oscillating mirror $i^1$, (the mirror-segment $h$ being clear of the latter at this moment) thence to the rotating mirror $h^1$, and finally to the screen, the direction of this projection from the mirror $h$ being the same as that of the preceding projection from the tilting mirror $i$.

When taking pictures by means of the apparatus, the rays arriving from the object taken pass to the film alternately in the direction $i\ h\ g$ and $h^1, i^1,\ g$.

It will be apparent therefore, that the same arrangement may be employed for projecting pictures, as well as for taking them, without the operation being affected by a disturbing parallax.

Any suitable means may be employed for rotating the mirror segments $h, h^1$ and for simultaneously oscillating the deflecting mirrors $i, i^1$. In the example illustrated the shaft $m^1$, which carries the shutter $m$, is provided with three bevel wheels $m^2$, $m^3$ and $m^4$. The wheel $m^4$ meshes with a wheel $s$ rotatable with the sprocket wheel $e$ for the film band $d$. The bevel wheels $m^2$ and $m^3$ respectively engage bevel wheels $n^2$ and $o^3$ on the shafts $n, o$ of the mirror segments $h, h^1$. The shafts $n, o$ have cams or tappets $u, t$ against which bear arms $u^1$, $t^1$ attached to the deflecting mirrors $i^1$, $i$. The bevel wheels $n^2$, $o^3$ are twice the size of the bevel wheels $m^2$, $m^3$ so that the shutter $m$ makes two revolutions for every revolution of the mirror segments $h, h^1$.

It will be apparent that when the shaft $m^1$ is driven the parts $e, m, h$ and $h^1$ of the system are positively rotated whilst the deflecting mirrors $i, i^1$ are simultaneously oscillated with the result already mentioned.

Having fully described my invention what I claim and desire to secure by Letters Patent is:—

1. The combination with cinematographic apparatus adapted for operation with a continuously running film-band, of optical compensating means, comprising two parallel mirrors inclined with respect to the optical axis of the objective of the apparatus and movable alternately into the ray-path through said objective, and two deflecting mirrors arranged for oscillation on opposite sides with respect to the first-mentioned mirrors.

2. The combination with cinematographic apparatus adapted for operation with a continuously running film-band, of two parallel mirrors, of which the one is movable intermittently in front of the objective of the apparatus and the other is movable synchronously with the first, two deflecting mirrors of which the one is arranged to reflect the rays reflected by the first-mentioned mirrors, and the other is arranged to reflect the rays reflected by the second mentioned mirror, and means for oscillating said deflecting mirrors.

3. The combination with cinematographic apparatus adapted for operation with a continuously running film-band, of two rotatable mirror-segments arranged parallelly with respect to one another but inclined with respect to the axis of the objective of the apparatus and movable alternately into the ray-path through said objective, and two oscillatory deflecting mirrors, arranged one in the objective-axis and the other laterally from it, the deflecting mirrors co-operating alternately with said inclined mirrors to deflect the rays.

4. The combination with cinematographic apparatus adapted for operation with a continuously running film-band, of two rotatable mirror-segments, arranged parallelly with respect to one another, but inclined with respect to the axis of said objective and being adapted to alternately reflect the rays, and two oscillatory deflecting mirrors, of which the one is located in the objective-axis and the other is arranged laterally from it, the planes of the first-mentioned two mirrors lying between the planes of said other two mirrors and each of these latter being adapted to cooperate with the rotatable mirror lying laterally from it.

In testimony whereof I affix my signature in presence of two witnesses.

OSKAR MESSTER.

Witnesses:
EMIL HEIN,
A. POHL.